United States Patent [19]

Van Der Meulen et al.

[11] Patent Number: 4,949,445

[45] Date of Patent: Aug. 21, 1990

[54] FITTED SLEEVE ON A ROLLER CORE

[75] Inventors: Anthonius M. Van Der Meulen, Helmond; Albert J. Bosch, Rijkevoort, both of Netherlands

[73] Assignee: Stork Screens B.V., Netherlands

[21] Appl. No.: 326,628

[22] Filed: Mar. 21, 1989

[30] Foreign Application Priority Data

Mar. 28, 1988 [NL] Netherlands ........................ 8800781

[51] Int. Cl.[5] ................................................ B60B 9/00

[52] U.S. Cl. ........................................ 29/117; 29/123; 29/130; 29/132; 29/121.1

[58] Field of Search .................... 29/117, 121.1, 121.5, 29/121.6, 123, 130, 132, 421.1, 424, 523

[56] References Cited

U.S. PATENT DOCUMENTS

| | | | |
|---|---|---|---|
| 3,035,331 | 5/1982 | Wieman | 29/117 |
| 4,332,073 | 6/1982 | Yoshida et al. | 29/523 X |
| 4,370,622 | 4/1983 | Punkston et al. | 29/130 X |
| 4,387,507 | 6/1983 | Kelly | 29/523 X |
| 4,388,752 | 6/1983 | Vinciguerra et al. | 29/523 X |
| 4,552,069 | 11/1985 | Jahn | 29/121.1 X |
| 4,641,411 | 2/1987 | Meulen | 29/121.1 X |
| 4,829,645 | 5/1989 | Kannwischer | 29/130 X |

FOREIGN PATENT DOCUMENTS

| | | |
|---|---|---|
| 0160341 | 6/1985 | European Pat. Off. . |
| 8302811 | 1/1985 | Netherlands . |

*Primary Examiner*—Timothy V. Eley
*Assistant Examiner*—Frances Chin
*Attorney, Agent, or Firm*—Lucas & Just

[57] ABSTRACT

Disclosed is a process for fitting a cylindrical sleeve around a cylindrical core. The core is covered with a layer of compressible material.

Upon mounting a pressurized medium is fed between the inner surface of the sleeve and the outer surface of the compressible layer.

The compressible layer, of which at least the outer layer is impermeable for the pressurized medium, is compressed and the sleeve can be slid on the core.

Also is disclosed a roller core for use in a process as discussed above.

6 Claims, 1 Drawing Sheet

FITTED SLEEVE ON A ROLLER CORE

BACKGROUND OF THE INVENTION.

The invention relates to a process for fitting a cylindrical sleeve around a cylindrical roller core, in the free state the sleeve having an internal diameter which is smaller than the external diameter of the roller core, by changing the diameter of the sleeve and the core relative to each other, using a pressurized medium flowing out on the periphery of the core, in such a way that the sleeve can be slid around the core and, when the sleeve and the core are in the desired position relative to each other, ending the supply of medium, thereby causing the sleeve and the core to mate tightly, the sleeve being impermeable to pressurized medium at least during the operation of fitting the sleeve round the core.

Such a process is known from European Patent Application No. 85 200 621.2 of Applicants.

The above-mentioned application describes a process in which a relatively thin-walled cylindrical, seamless perforated sleeve is fitted on the surface of a cylindrical roller core. For carrying out the above-mentioned process, in a suitable embodiment the perforations of the perforated material used, for example a metal rotary silk-screen printing stencil, are temporarily sealed with a material which is impermeable to a gaseous or liquid medium, following which said completely tight sleeve is slid over the cylindrical core with the aid of the medium used, the pressurized medium used serving to expand the sleeve temporarily within the elasticity range during the slide-on operation, so that said sleeve acquires an internal diameter which is greater than the external diameter of the roller core used. The medium used, for example compressed air, in this situation serves both as an expansion agent and as a lubricant for moving the sleeve over the core.

A roller with such a sealed perforated material on the surface is washed with a suitable solvent after the fitting operation, in order to remove the sealing material from the perforations, and this produces a roller with a surface containing a large number of cavities (the perforations of the stencil); such a roller can be used, for example, as an inking or colour application roller in a printing machine.

In the event of the sleeve being unperforated, in this case known as a "blind", a completely closed surface is obtained; such a rigid roller provided with a top layer can also be used in a printing machine, for example as a guide roller with special features which are connected with the type of sleeve.

The known process has the disadvantage that for it to succeed it is necessary for the sleeve to be of limited thickness, i.e. of such thickness that at relatively low and unhazardous pressure of the medium a sufficient diameter increase is achieved.

For sleeve material with thicker walls no suitable unhazardous possibility is offered by this known process.

SUMMARY OF THE INVENTION

The object of the present invention is to produce a process of the above type which can be used for both thin-walled and thick-walled cylindrical sleeves for fitting round the external surface of a suitable roller core.

The process of the type indicated is to that end according to the invention characterized in that the core is covered on its surface with a layer of material which is compressible under the influence of the pressurized medium, and the medium is fed in at the boundary face between the compressible material and the sleeve to be fitted.

Through the process according to the invention, the compressible material which is placed on the external surface of the roller core used is therefore compressed under the influence of the pressurized medium, for example air, which is used for the fitting operation.

For the process to succeed it is, of course, necessary for the compressible material to be impermeable to the pressurized medium; a compressible material provided with a layer which is impermeable to the medium at least on the surface which is going to adjoin the inside of the sleeve is therefore used.

The materials used can therefore be homogeneous impermeable materials, but also, for example, foam rubber or foam plastic materials whose surface facing away from the roller core is closed.

It is advantageous in the process according to the invention to feed in the pressurized medium at the end of the core at the place where sleeve and core approach each other at the beginning of the combining operation, while medium can also be fed in at a place outside the above-mentioned end area, and the medium can be fed in as desired at one of the above-mentioned places or at both places.

The medium outflow places present at the end of the roller core serve in particular for the fitting operation. The sleeve to be fitted is slid over a short distance onto the core, in such a way that the medium supply apertures are covered. The medium infeed is then opened, causing pressure to be built up between the sleeve and the top side of the compressible material. Since the sleeve is relatively rigid in relation to the compressible material, the compressible material will be compressed, so that the sleeve fits amply round the compressible material, while the pressurized medium, for example air, serves as a lubricant during the remainder of the slide-on operation. In this way the entire length of the sleeve can be fitted round the core. Medium infeed at a point outside the end area of the core is advantageous if a sleeve has to be removed from the core, and if the sleeve is slid so far onto the core that the medium outflow apertures at the end of the core are no longer covered. With a separately operated outflow aperture outside the end area of the core, for example halfway along the core, the compressible material can be compressed, so that the sleeve is simple to slide off the core.

The invention also relates to a roller core for an assembly comprising the above-mentioned roller core and a cylindrical sleeve to be fitted around the roller core, the roller core being provided at one end with one or more outflow apertures for pressurized medium for changing the relative diameters of the roller core and the sleeve to be fitted around the roller when the cylindrical sleeve is being slid onto the roller core.

Such a roller core is according to the invention characterized in that the roller core is covered on its surface with a layer of material which is compressible by the pressurized medium fed in through the outflow apertures.

Such a roller core according to the invention is such that the layer of compressible material has a layer which is impermeable to the pressurized medium at least on its surface facing away from the roller core.

The layer which is impermeable to pressurized medium can be smooth, but it can also be a slightly roughened or grooved type. If the impermeable layer is roughened or grooved, a slightly easier slide-on operation is obtained through the fact that the contact surface between the sleeve and outer layer of the compressible material has become smaller.

The compressible material can be made of a plastic or a rubber and can be solid or in foam form.

In view of the desire to make the sliding-on of the sleeve easier, the compressible material on the roller core can also be provided with radial, circular grooves extending from the surface in the direction of the roller core surface.

The presence of these grooves means that only slight friction occurs during the sliding-on of the sleeve, and it also greatly reduces the risk of the compressible material being upset.

The compressible covering layer can advantageously be provided with a bevelled edge at one side, the side at which the slide-on operation begins.

The roller core according to the invention is very advantageously provided with several outflow apertures connected to the inside of the roller core at one end and with one or a small number of individually operated auxiliary outflow apertures a distance away from said end. As indicated earlier, the outflow apertures present at the end are for the slide-on operation itself, while the above-mentioned auxiliary outflow aperture(s) is (are) mainly used for the operation which aims to take the assembly of sleeve and roller core apart. The auxiliary apertures however may also serve to facilitate the sliding-on operation for example when high friction conditions exist such as in the case of great length, high roughness etc.

DESCRIPTION OF THE DRAWING

The invention will now be explained with reference to the accompanying drawing, in which:

In FIG. 1 the sleeve to be fitted, a perforated stencil or a closed sleeve, is indicated by reference number 1. The stencil or the sleeve can be made from, for example, seamless, electrodeposited metal such as nickel. The sleeve 1 can, however, also be, for example, a plastics material, while for the invention to succeed a seamless type is attractive, but is not absolutely essential. The inside of the sleeve 1 however is preferably completely smooth, i.e. the inner surface of the sleeve is cylindrical.

Figure 1:
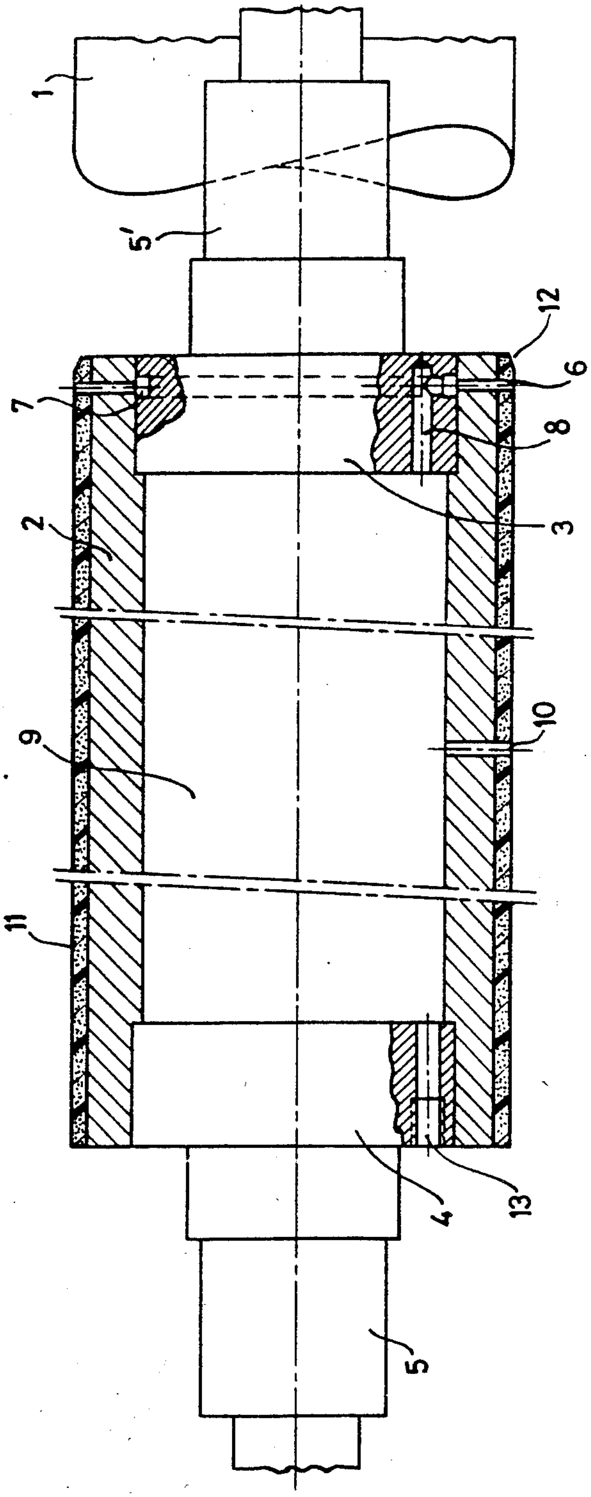
FIG. 1 shows a schematic sectional view of a roller core according to the invention on which a sleeve can be fitted.

The roller core is indicated by 2, while reference numbers 3 and 4 indicate disc-type parts which are confined tightly and in sealing fashion in the ends of the roller core 2. The roller core 2 will often be made of a metal such as steel or aluminium. For certain applications plastic can, however, be used. Shafts 5 and 5', which are used to fit the finally shaped roller in, for example, a printing machine, are fixed to the disc-type parts. The disc-type part 3 contains a circular groove 7 which is connected at one side by ducts 8 to the interior 9 of the roller core and at the other side opens by means of ducts 6 onto the external surface of the compressible material 11 fitted on the roller core. The interior of the roller core 9 is connected by means of medium feed aperture 13 to a source of pressurized medium (not shown), for example a compressor or a pressure vessel. The compressible covering 11 is provided with a bevelled edge 12 at the end where the outflow apertures 6 are located. When the sleeve 1 is being fitted it is first pushed a short distance over the bevelled edge and the outflow apertures 6; the medium supply is then opened; a pressure build-up takes place between the sleeve 1 and the outside of the covering is compressed. The sleeve 1 can now be pushed with slight force over the entire length of the roller core 2. When the assembly of sleeve 1 and roller core 2 is being taken apart, the operation is carried out in the reverse order; the medium supply to the ducts 6 via the interior 9 of the roller core 2 is opened; the covering 11 is compressed relative to the sleeve 1, and the sleeve can be slid off the core. If the end of the sleeve 1 is slid past the outflow apertures 6, outflow aperture 10 is actuated, while the openings 6 are closed if necessary. In this way it can be ensured that the end of the sleeve 1 comes to lie over the apertures 6 again, so that the sliding-off operation can subsequently take place smoothly by actuation of the apertures 6.

In order to carry out the operation of fitting and removing the sleeve it is in fact not strictly necessary to open and close the apertures 10 and 6 separately. Through suitable dimensioning of the apertures and through appropriately choosing the pressure of the medium applied, it is also possible to ensure proper carrying out of the process without individual actuation. If desired, the person carrying out the operation can shut off aperture 10 with his finger during the sliding-on process, while during the removal operation such an action can also be used for the outflow apertures 6 located at the end of the core.

As regards the materials used for the compressible covering layer, it is possible to use many types of plastic or rubber, factors such as hardness, chemical resistance and the like being important in connection with the desired properties of the final roller.

As regards the pressurized medium generally used, it will be preferable to use compressed air, a compressible material with such compressibility being used that it is possible to work with standard compressed air systems up to approx. 8 kg/cm$^2$.

The number of outflow apertures used at the end of the roller core 2 will generally be approximately 8 apertures, while a single outflow aperture 10 in the central part of the roller core will generally be sufficient to permit movement of the sleeve 1 until its end lies over the outflow apertures 6.

Of course, more than one outflow aperture 10 can be present, if desired. In the foregoing description of the figure the sleeve is considered to be closed during the mounting and removing operation. In case of a perforated sleeve, such as for example a seamless nickel screen or other perforated material the perforations are temporary closed as described earlier prior to the sliding on operation; the lacquer used such as polyvinylalcohol or polyvinylacetate is removed by washing with a suitable solvent after finishing of the mounting operation. Provided the compressible material is (made) not adherent, upon removal of a screen the perforations may be filled such that after drying thereof the screen may be slid off.

What is claimed is:

1. A roller assembly comprising a roller core having a diameter which may be changed and a cylindrical sleeve which is to be disposed around the roller core, the roller core having at least one end with one or more outflow apertures for pressurized medium for changing the diameter of the roller core and the sleeve relative to each other upon feeding of the pressurized medium through the outflow apertures when the cylindrical sleeve is being pushed onto the roller core, and in which the roller core is covered on its surface with a layer of material which is compressible by the pressurized medium fed in through the outflow apertures.

2. The roller assembly of claim 1, in which the layer of compressible material of the roller core has an outer layer which is impermeable to the pressurized medium at least on its surface facing away from the roller core.

3. The roller assembly of claim 1, in which the layer of compressible material of the roller core is selected from a group consisting of plastics and rubbers in solid or in foam form.

4. The roller assembly of claim 3, in which the layer of compressible material of the roller core has grooves running radially or helically all the way around and extending from the surface of the layer in the direction of the surface of the roller core.

5. The roller assembly of claim 1, in which the layer of compressible material of the roller core has a bevelled edge at one side.

6. The roller assembly of claim 1, in which several outflow apertures connected to the interior of the roller core are present at one end thereof and one or a small number of individually operable auxiliary outflow apertures are present at a distance from said end.

* * * * *